United States Patent
Chan et al.

(10) Patent No.: US 10,742,064 B2
(45) Date of Patent: *Aug. 11, 2020

(54) SOLAR BATTERY SYSTEM FOR LOW TEMPERATURE OPERATION

(71) Applicant: Lithium Power, Inc., San Jose, CA (US)

(72) Inventors: Wilson Chan, San Jose, CA (US); Chu Chi Kuo, Hsinchu (TW)

(73) Assignee: Lithium Power, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,542

(22) Filed: Dec. 10, 2018

(65) Prior Publication Data

US 2019/0140475 A1    May 9, 2019

Related U.S. Application Data

(63) Continuation-in-part of application No. 15/266,950, filed on Sep. 15, 2016, now Pat. No. 10,181,814.

(60) Provisional application No. 62/219,102, filed on Sep. 15, 2015.

(51) Int. Cl.
*H02J 7/35* (2006.01)
*H02S 40/38* (2014.01)
*H01M 10/615* (2014.01)
*H02J 7/00* (2006.01)

(52) U.S. Cl.
CPC ............. *H02J 7/35* (2013.01); *H01M 10/615* (2015.04); *H02J 7/0029* (2013.01); *H02J 7/0077* (2013.01); *H02J 7/0091* (2013.01); *H02S 40/38* (2014.12); *H02J 7/0013* (2013.01); *H02J 7/00302* (2020.01); *H02J 7/00304* (2020.01)

(58) Field of Classification Search
CPC .......... H02J 7/35; H02J 7/0029; H02J 7/0077; H02J 7/00304; H02J 7/00302; H02J 7/0013; H02S 40/38; H01M 10/615
USPC ......................... 320/101, 108, 109, 113, 115
See application file for complete search history.

(56) References Cited

U.S. PATENT DOCUMENTS

| | | | | |
|---|---|---|---|---|
| 4,622,509 | A * | 11/1986 | Spruijt .............. | H01M 10/486 320/130 |
| 10,505,240 | B1 * | 12/2019 | Bruce ................. | F28D 20/023 |
| 2009/0058361 | A1 * | 3/2009 | John .................. | A61N 1/3785 320/128 |
| 2011/0181233 | A1 * | 7/2011 | Mino .................. | B60L 53/51 320/101 |
| 2012/0025752 | A1 * | 2/2012 | Teggatz .............. | H02J 7/35 320/101 |
| 2012/0235477 | A1 * | 9/2012 | Korman ............... | E04F 10/005 307/11 |
| 2014/0030560 | A1 * | 1/2014 | Lev ................... | B60L 50/66 429/72 |
| 2014/0239903 | A1 * | 8/2014 | Choi .................. | H01M 10/637 320/128 |
| 2014/0266038 | A1 * | 9/2014 | Gibeau ............... | H01M 10/443 320/109 |

(Continued)

*Primary Examiner* — Phallaka Kik
(74) *Attorney, Agent, or Firm* — Wang Law Firm, Inc.

(57) ABSTRACT

A power delivery device includes at least one solar panel, a battery pack comprising at least one battery, and a heater, wherein the device is configured to measure the temperature of the battery pack and power the heater to heat the battery pack if it is too cold for optimal charging.

14 Claims, 6 Drawing Sheets

(56) References Cited

U.S. PATENT DOCUMENTS

| | | | |
|---|---|---|---|
| 2014/0277869 A1* | 9/2014 | King | B60H 1/00278 701/22 |
| 2015/0054460 A1* | 2/2015 | Epstein | B60L 11/187 320/109 |
| 2015/0061570 A1* | 3/2015 | Joshi | H01M 10/3909 320/101 |
| 2015/0217623 A1* | 8/2015 | Hatakeyama | B60L 1/003 165/42 |
| 2016/0219664 A1* | 7/2016 | Ellenberger | H02J 1/00 |
| 2016/0270188 A1* | 9/2016 | Kaag | H02J 7/0063 |
| 2017/0194811 A1* | 7/2017 | Chan | H02S 40/40 |
| 2017/0267107 A1* | 9/2017 | Miyashita | H01M 10/46 |
| 2017/0267113 A1* | 9/2017 | Harada | B60L 8/003 |
| 2017/0346089 A1* | 11/2017 | Yamamoto | H01M 2/10 |
| 2018/0019611 A1* | 1/2018 | Zhang | H01M 10/0525 |
| 2018/0069272 A1* | 3/2018 | Seo | B60L 58/12 |
| 2018/0115029 A1* | 4/2018 | Ren | H01M 10/613 |
| 2018/0141458 A1* | 5/2018 | Jammoul | B60L 11/1874 |
| 2018/0198294 A1* | 7/2018 | Sheeks | H01M 2/1077 |
| 2018/0262019 A1* | 9/2018 | Homma | H02J 7/342 |
| 2018/0281618 A1* | 10/2018 | Ogaki | B60L 53/22 |
| 2018/0376625 A1* | 12/2018 | Truettner | H05K 7/20909 |
| 2019/0036350 A1* | 1/2019 | Gleason | H02J 7/0091 |
| 2019/0039477 A1* | 2/2019 | Ohgaki | H01M 10/633 |
| 2019/0047429 A1* | 2/2019 | Torkelson | H01M 10/486 |
| 2019/0084435 A1* | 3/2019 | Grace | B60L 53/62 |
| 2019/0217721 A1* | 7/2019 | Marcicki | H01M 10/63 |
| 2019/0315247 A1* | 10/2019 | Ishihara | B60L 50/50 |
| 2019/0326771 A1* | 10/2019 | Mack | H02J 7/025 |
| 2019/0348724 A1* | 11/2019 | Satoh | B60L 50/50 |
| 2019/0363550 A1* | 11/2019 | Zuo | H01M 10/657 |
| 2019/0366876 A1* | 12/2019 | Cheadle | H01M 10/625 |
| 2019/0372179 A1* | 12/2019 | Singer | B60L 58/27 |
| 2019/0386357 A1* | 12/2019 | McHugh | H01M 10/657 |
| 2020/0119410 A1* | 4/2020 | Tian | H02J 7/007 |

* cited by examiner

SOLAR BATTERY SYSTEM FOR LOW TEMPERATURE OPERATION

CROSS REFERENCE TO RELATED APPLICATIONS

The present application is a continuation-in-part of U.S. patent application Ser. No. 15/266,950 filed on Sep. 15, 2016, which is a non-provisional of U.S. Provisional App. No. 62/219,102, filed Sep. 15, 2015, which are herein incorporated by reference.

FIELD OF THE INVENTION

The present invention generally relates to solar energy, and more specifically relates to a solar power system incorporating battery storage.

BACKGROUND OF THE INVENTION

Solar power is highly useful for applications where long-term, remote operation is desired, such as lights, road signs, security cameras, and so on. Since some of those devices need to operate at night as well, a battery to store the solar energy accumulated during the day is useful.

One problem associated with batteries, particularly lithium batteries, is that they typically do not charge very well in low temperatures, rendering them less useful for outdoor applications in cold climates. While a battery can still release power in low temperatures, it cannot be charged in such conditions. This means that the solar energy released on a cold, sunny day would be wasted, and the device would not be able to operate at night—even though if the battery were fully charged, it could operate just fine.

For example, the temperature range in which a NiMH battery can be charged is 0° C. to 45° C.; the temperature range in which it can be discharged is −20° C. to 65° C. The ranges are similar for Li-ion batteries; the temperature range for charging is 0° C. to 45° C. and for discharging is −20° C. to 60° C. While temperatures in excess of 45° C. are uncommon, temperatures below 0° C. are extremely common in the winter in some locations, and it is also quite common for temperatures to not rise to 0° C. at all on a winter day; thus, an outdoor solar-powered battery would not be able to be charged at all on those days, even though it could be discharged.

A need exists for a solar-charged battery that can operate in a wide range of temperatures and that can be optimally charged even when the ambient temperature is low.

SUMMARY OF THE INVENTION

The present invention introduces a novel approach to charge a battery under different conditions using energy generated by a solar panel. In one embodiment, the present invention is a method for charging a battery using a system having a solar panel, a controller, a temperature sensor, a battery charger, an over voltage protection circuit, and over current protection circuit, a user interface, and a heater, the method comprising receiving temperature of the battery from the temperature sensor, receive voltage from the battery, determine whether or not the at least one battery is fully charged, if the temperature is within a range for battery charging, charging the battery pack through the battery charger using power produced by the solar panel, and if the temperature is low for battery charging, heating the battery using the heater until the temperature is favorable for battery charging.

In another embodiment, the present invention is a battery solar power charging system for charging a battery pack and comprises a solar panel generating electricity, a controller connected to the solar panel, a temperature sensor connected to the controller and sensing temperature of the battery, a battery charger connected to the battery and charging the battery, and a heater connected to the battery and heating up the battery, wherein if the temperature of the battery is within a range for charging the battery, the battery charger charges the battery using electricity generated by the solar panel, and if the temperature is low for charging the battery, the heater is turned on to heat up the battery.

DETAIL DESCRIPTION OF THE INVENTION

Figure 1:
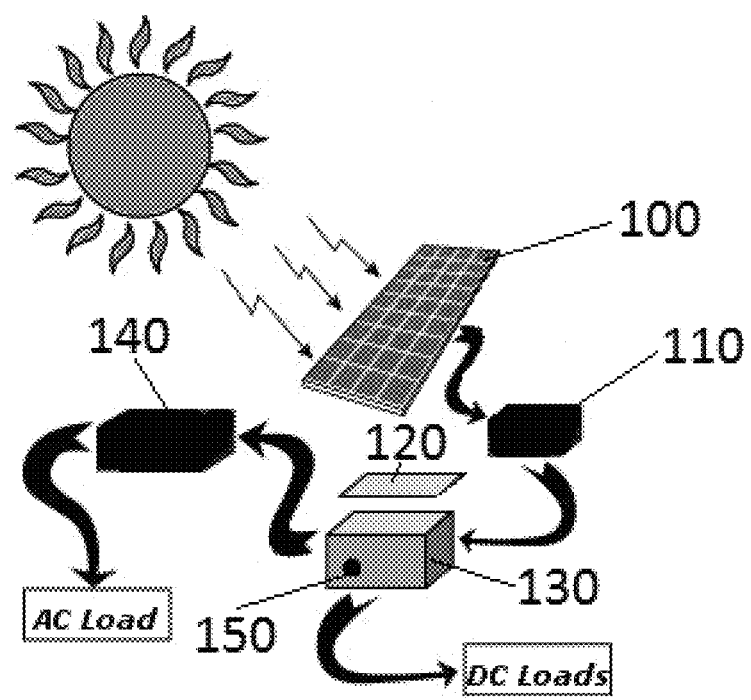
FIG. 1 shows a schematic diagram of the preferred embodiment of the present invention.

As shown in FIG. 1, the preferred embodiment of the present invention preferably comprises at least one solar panel 100, a controller 110, a battery pack 130, and a heater 120 and a temperature sensor 150 located on the battery pack. The controller 110 is connected to the heater 120 and to the temperature sensor 150, and is also connected to the battery charging circuit (not shown). For AC applications, a micro-inverter 140 is used to convert the output current to AC.

The present invention preferably operates as follows. Temperature sensor 150 measures the temperature of the battery pack 130. The controller 110 receives the temperature information, along with information on whether the solar panel 100 is producing energy (electricity) and information on whether the battery pack needs to be charged. If the solar panel 100 is producing energy and the battery pack 130 needs to be charged, and if the temperature of the battery pack is within the optimal range for charging, the battery charging circuit is used to charge the battery pack. If the solar panel 100 is producing energy, the battery pack needs to be charged, but the temperature of the battery pack is below the optimal range, the controller turns off the battery charging circuit and turns on the heater. The heater may be connected to the solar panel and powered by the energy generated by the solar power. Alternatively, the heater may be powered by an external source. The battery pack is heated until its temperature falls into the optimal range for charging, and then charged.

In the preferred embodiment, the temperature sensor monitors the battery pack continuously. If the battery pack's temperature falls below the optimal range at any time, the controller turns off the battery charging circuit, turns on the heater, and heats the battery pack until its temperature falls into the optimal range for charging.

The optimal temperature range for charging varies depending on the type of battery used. In the preferred embodiment, NiMH or Li-ion batteries are used. The temperature range at which a NiMH or a Li-ion battery can be charged is 0° C. to 45° C.; thus, if the temperature sensor detects a battery temperature that is below 0° C., the controller turns on the heater and heats the battery pack until its temperature reaches at least 0° C. The battery pack is then charged.

Most batteries have a narrower temperature range at which the battery can be charged fast. For example, for a NiMH battery, the temperature range for fast charging is 10° C.-30° C. In an embodiment, the controller turns on the heater any time the temperature sensor detects a battery temperature that is below the range for fast charging (even if the battery can be charged at that temperature), and heats the battery until its temperature reaches at least the lower bound of the range for fast charging.

In the preferred embodiment, over voltage protection and over current protection circuits are used to protect the battery pack. Any over-voltage or over-current condition stops the charging or the discharging process. It will, however, be understood that these protections are not required for practicing the present invention.

The battery pack preferably comprises one or more battery cells. For embodiments where the battery pack comprises more than one battery cells, the battery cells are preferably connected in series. However, any method of connecting the battery cells may be used for practicing the present invention.

The battery cells used in the battery pack are preferably identical, to facilitate charging. However, it is not required for practicing the present invention for the battery cells to be identical.

Figure 2:
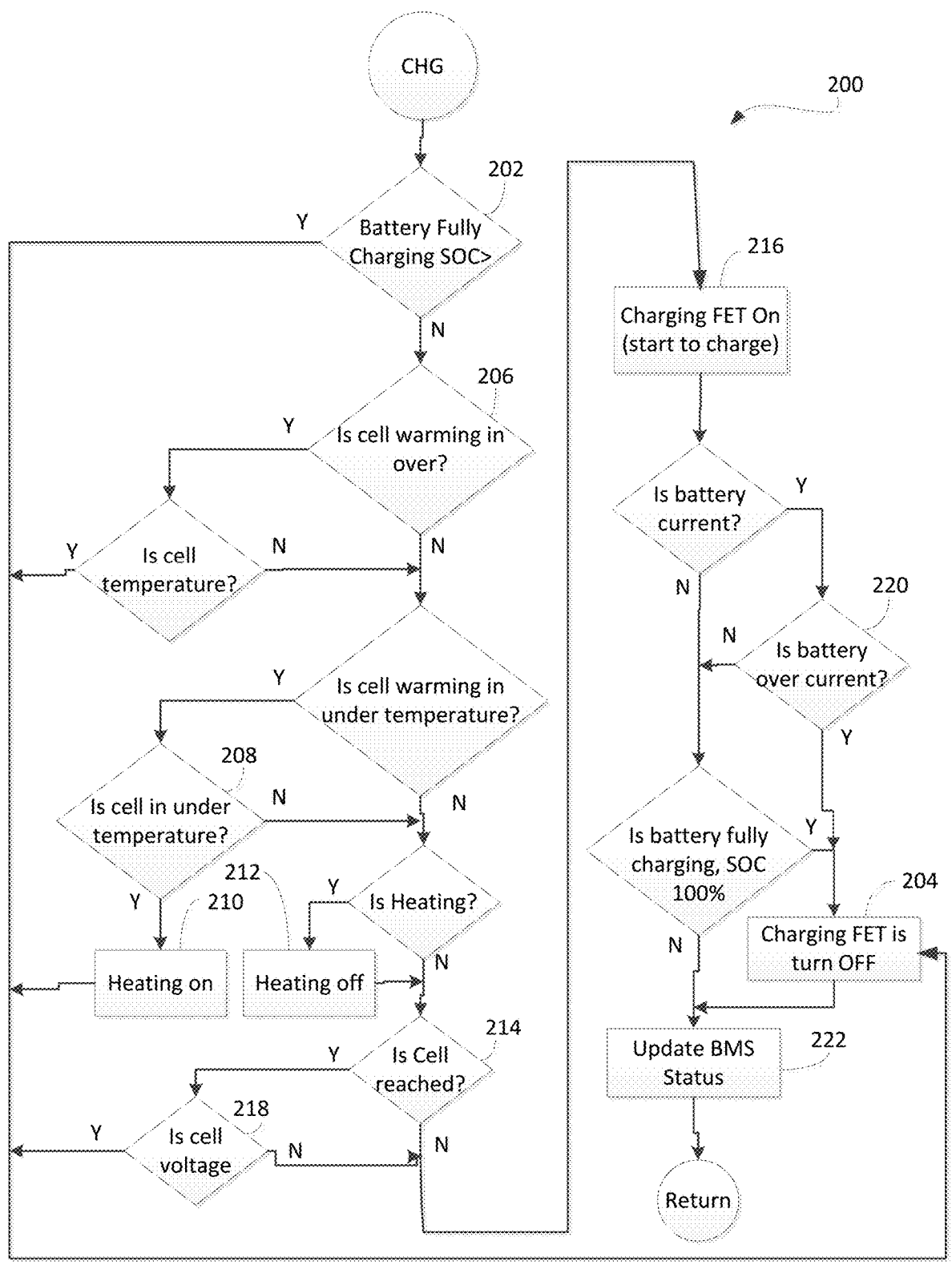
FIG. 2 shows a flowchart for the charging process for the preferred embodiment of the present invention.

FIG. 2 is a flowchart showing the algorithm 200 for the operation of the system of the preferred embodiment of the present invention, using a charging FET as the battery charger. If the battery is fully charged 202, the charging FET is turned off 204. If the battery is not fully charged, the system then reads the battery temperature 206. If the battery temperature is under the lower bound of the acceptable temperature range 208, the heater is turned on 210. Once the battery temperature is within the acceptable temperature range, the heater is turned off 212. The system next reads the voltage of the battery and determines whether or not it is at a high voltage level 214. If it is not, the charging FET is turned on and the battery begins to charge 216. If the voltage is high, the system next checks whether or not it is too high 218; if it is too high, the overvoltage protection circuit (OVP) is turned on and the charging FET is not turned on. The system also checks whether the battery current is too high 220; if it is too high, the over current protection circuit (OCP) is turned on and the charging FET is turned off. Once the battery is fully charged, the charging FET is turned off and the battery status is updated 222.

Figure 3:
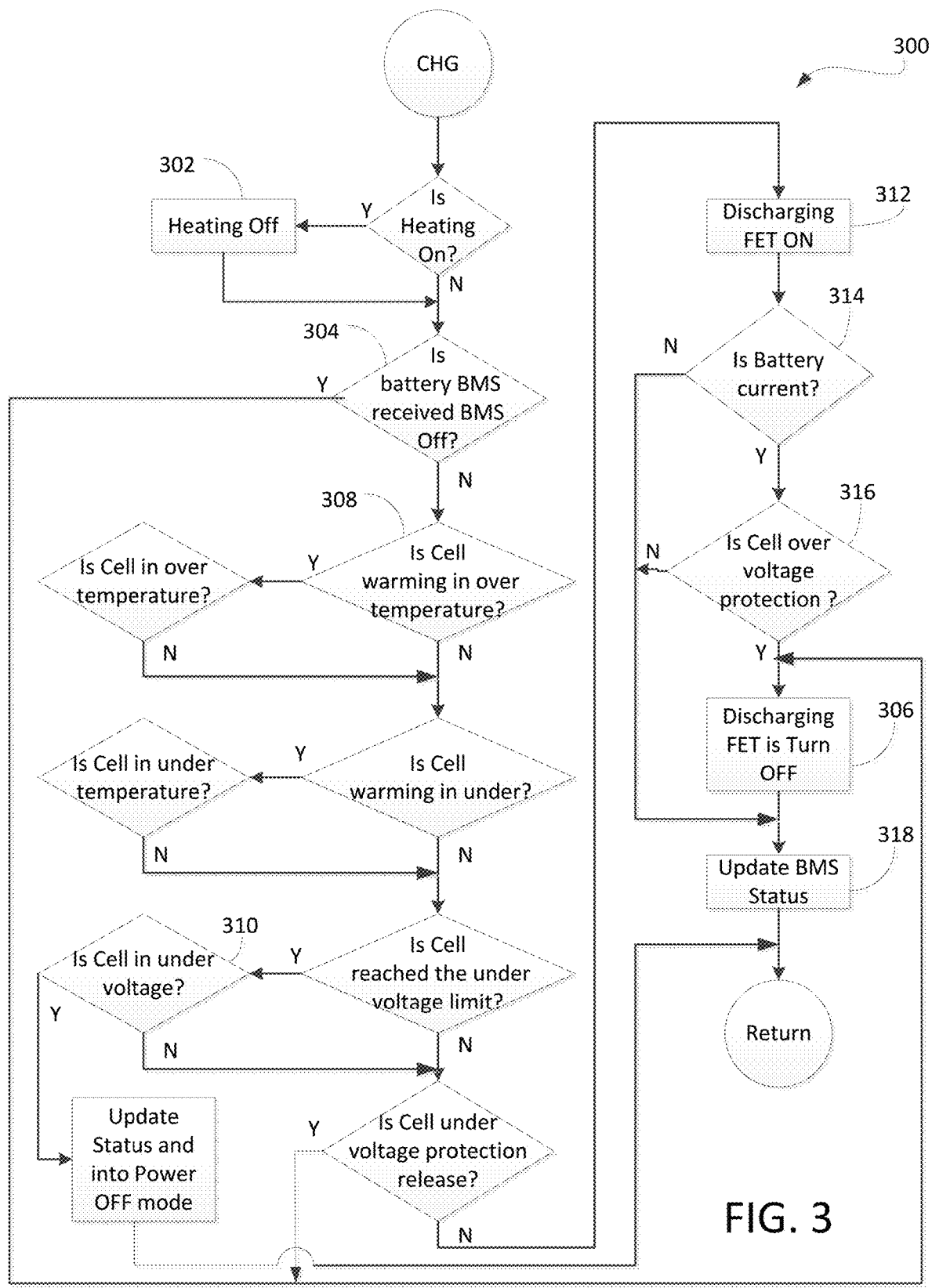
FIG. 3 shows a flowchart for the discharging process for the preferred embodiment of the present invention.

FIG. 3 is a flowchart 300 showing the discharge process for the battery. First of all, the heater is turned off 302 (it is not needed to heat the battery during discharging, as the acceptable temperature range for discharging is wider for NiMH and Li-ion batteries than it is for charging). If the system receives an OFF command 304, the discharging FET is turned off 306. If it does not, the system next checks whether or not the temperature is over or under the acceptable range for discharging 308 (which may, as mentioned, be different from the acceptable range for charging). If it is outside the acceptable range, the discharging FET is turned off. Next, the system checks whether the battery has a low voltage 310, and turns off the discharging FET if it does. It also turns off the discharging FET if the under voltage protection (UVP) circuit is triggered. If the battery does not have a low voltage and the UVP is not triggered, the discharging FET turns on 312. The system then checks to see whether the battery is producing current 314; if it is, the system checks to see whether the over current protection circuit (OCP) is turned on 316. If it is, the discharging FET is turned off and the status of the system is updated 318.

It will be understood that even though a charging FET and discharging FET are used for the preferred embodiment of the present invention, other battery charging and discharging circuits known in the art may also be used.

The temperature sensor is preferably a thermocouple located directly on the battery. Other temperature sensors capable of detecting the temperatures likely to be encountered by the system of the present invention are also acceptable for practicing the present invention.

The controller is preferably a high system level integration RISC MCU platform with high precision 16-bit coulomb counting ADC. It preferably comprises an EEPROM to store manufacturer data and a history log, and any other data required for the operation of the system. However, any other similar processor and memory may be used for this purpose.

The present invention preferably comprises a communication unit. The communication unit may be used for communicating between the controller and a mobile device such as a smartphone or tablet, or between the controller and the Internet. Any communications protocol may be used for this purpose; WiFi is preferable. A user may use a mobile device to connect to the controller and instructions may be sent from the mobile device to the controller. The mobile device may also obtain the system status from the controller. The communication unit may also be equipped to connect to a cellar network, so a battery solar charging system of the present invention may report its status to a remote control center and receive instructions from the remote control center.

The battery solar charging system according to the present invention preferably comprises a user interface. In the preferred embodiment, the user interface comprises at least one LED as a status display; however, the present invention may also communicate user interface data to and from a smartphone or tablet. The user interface may include buttons, switches, or other input methods for entering information, and a display for displaying battery status information, temperature data, and other relevant information. The user may use the user interface to send instructions and to control the operations of the battery solar charging system and to obtain the operational status of the same system.

Since the present invention is preferably used in outdoor application, it preferably comprises a rugged and waterproof/dustproof case to keep the system from getting damaged. In the preferred embodiment, the case is compliant with the IP65 standard.

The present invention has many applications. One group of potential applications is freestanding DC applications—electric power devices that are not connected to the grid. For example, the system of the present invention may be used to power streetlights, road signs, outdoor security cameras, portable electronic devices, and so on. Any size or type of battery may be used with the present invention; similarly, any size or type of solar panel may be used. Another group of potential applications for the present invention are grid applications; the present invention may be plugged into the electric grid to generate energy. For those applications, at least one micro-inverter should be used to convert the output of the system to AC. The micro-inverters have to match the wattage of the solar panels used; i.e. if 4 kW solar panels are used, 4 kW of micro-inverters have to be used.

Figure 4:
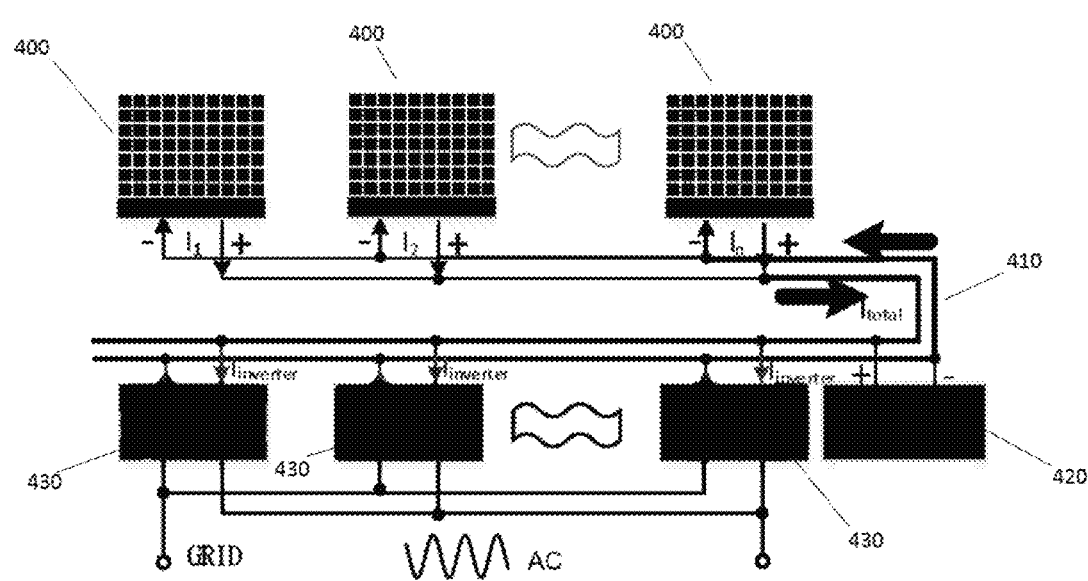
FIG. 4 shows a schematic diagram for an AC-output embodiment of the present invention.

FIG. 4 shows a diagram of one embodiment of the system of the present invention comprising micro-inverters for AC output. A plurality of solar panels 400 are connected to a low voltage DC bus 410. Battery pack 420 is also connected to the low voltage DC bus 410. Battery pack 420 also includes a heater and a temperature sensor (not shown), and a charging circuit (not shown). A plurality of micro-inverters 430 are connected to the low voltage DC bus 410 and provide AC output (in the diagram, they are connected to the grid, however this is not essential for practicing the present invention).

Figure 5:
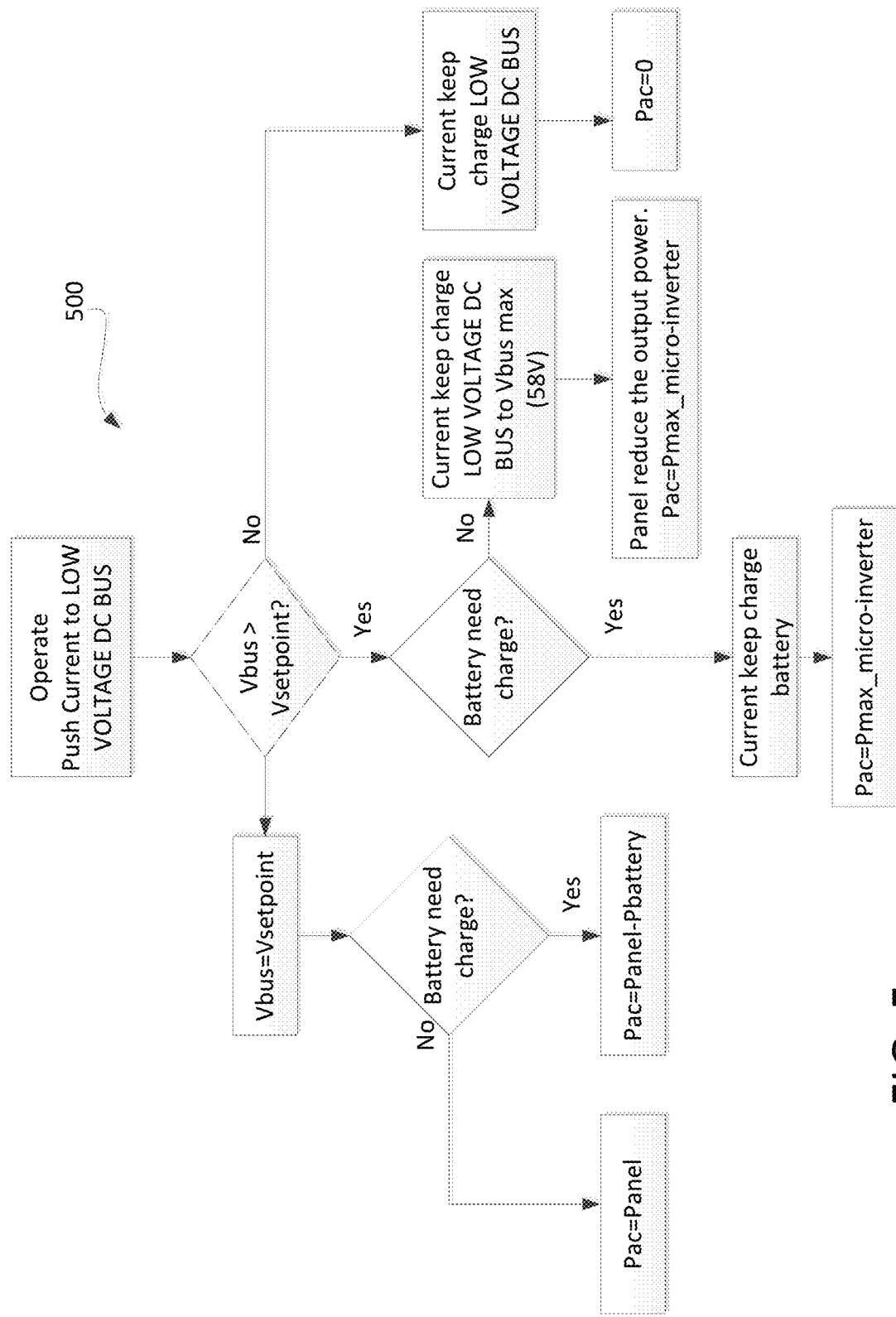
FIG. 5 shows a flowchart for the operation of an AC-output embodiment of the present invention.

FIG. 5 shows a flowchart 500 for the operation of the system described in FIG. 4. When the battery pack 420 is not charged and the solar panel receives power, current is pushed to the low voltage DC bus. If the voltage at the low voltage DC bus is below a predetermined or predefined setpoint voltage Vsetpoint, the micro-inverters are not turned on and all of the solar power is used to charge the battery pack.

As the battery pack is charged, the voltage at the low voltage DC bus rises. Once the voltage is above Vsetpoint, the micro-inverters are turned on and the system outputs power while continuing to charge the battery pack. After the battery pack is fully charged, assuming the solar panels keep generating maximum power, the micro-inverters are turned on to maximum power.

As the day goes on, the amount of sunshine reaching the solar panels drops. The solar panels no longer generate as much power and the voltage at the low voltage DC bus drops. If the solar panels can still keep generating enough power to keep operating the micro-inverters at their maximum power, the battery pack is not discharged. Once the solar panels no longer generate enough power to keep operating the micro-inverters at their maximum power, the battery pack is discharged to make up the difference.

At night, solar panels do not generate any power. Once the solar panels stop producing power, the battery pack is used to power the micro-inverters until it is fully discharged.

It will be understood that at any point during the process of charging the battery pack, if the battery pack gets too cold for efficient charging to take place, the charging process will halt and the heater will be turned on until the battery pack reaches a temperature that is within the optimal range for charging. The charging process will then resume.

Figure 6:
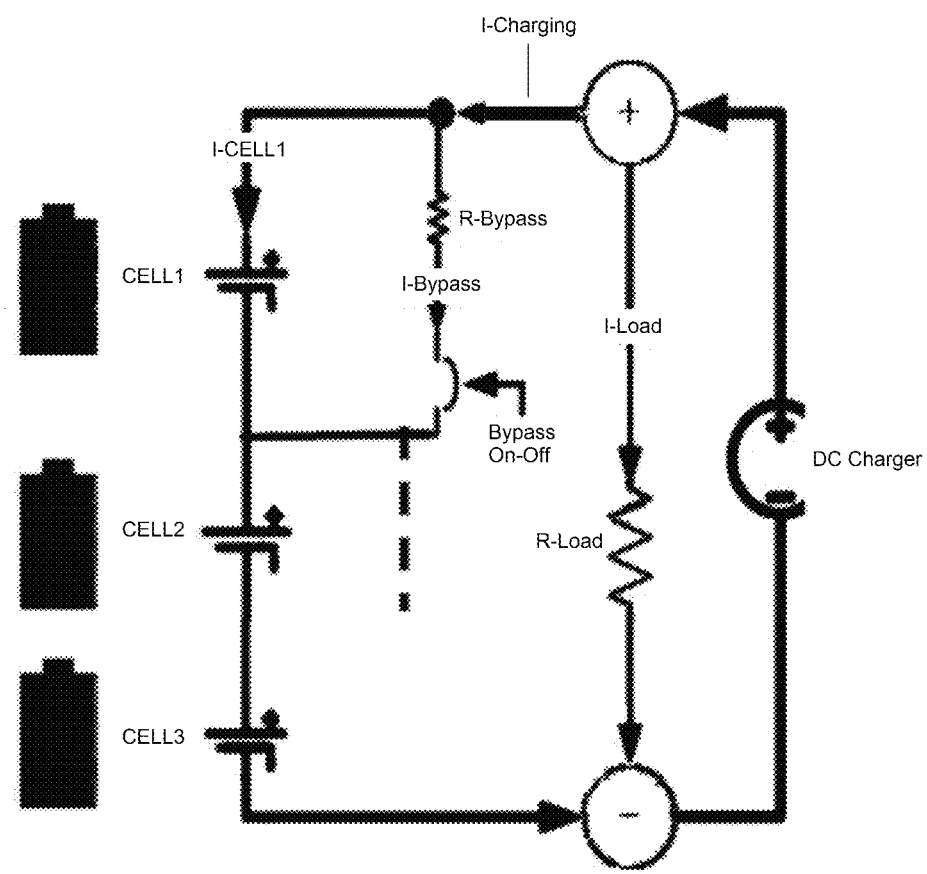
FIG. 6 shows a cell balancing circuit of an embodiment of the present invention.

FIG. 6 shows an exemplary embodiment of a cell balancing circuit for the battery pack. The purpose of the cell balancing circuit is to bypass a fully charged battery cell during charging, so that energy is not wasted and cycle life is improved. As shown in the Figure, a bypass circuit is provided for each battery cell, comprising a resistor R-bypass and a switch. In the preferred embodiment, if the voltage of any battery cell is determined to exceed the average voltage for all the batteries by a predetermined amount, the switch of the bypass circuit for that battery cell is turned on and the battery cell is bypassed. The predetermined amount is 300 mV in the preferred embodiment, but can be any amount.

Exemplary embodiments are described above. It will be understood that the present invention comprises many other embodiments that may be considered reasonable equivalents to the embodiments described above, and is limited only by the appended claims.

The invention claimed is:

1. A method for charging a solar battery using a system having at least one solar panel, a controller, at least one temperature sensor, a battery charger, an over voltage protection circuit, an over current protection circuit, a user interface, and a heater, the method comprising:
    receiving temperature of the battery from the temperature sensor;
    determining whether or not the temperature of the battery pack is within the optimal range for battery charging;
    determining whether the at least one solar panel is producing power;
    receive voltage from the battery;
    determine whether or not the at least one battery needs to be charged;
    if the temperature is within a range for battery charging and the at least one battery needs to be charged, charging the battery pack through the battery charger using the power produced by the solar panel; and
    if the temperature is below the range for battery charging and the at least one battery needs to be charged, turning off the battery charger and heating the battery using the heater until the temperature of the battery is within the range for battery charging,
    wherein the heater is powered by the at least one solar panel.

2. The method of claim 1, further comprising if the voltage indicates the battery is fully charged, turning off the battery charger.

3. The method of claim 1, further comprising:
    if the voltage indicates the battery is not fully charged and the temperature is outside an acceptable range, turning on the heater; and
    if the voltage indicates the battery is not fully charged and the temperature is within the acceptable range, turning off the heater.

4. The method of claim 1, further comprising if the voltage is above a predefined level, turning off the voltage charger.

5. The method of claim 1, further comprising if a current from the battery is above a predefined level, turning off the voltage charger.

6. The method of claim 1, further comprising:
    connecting to a mobile device; and
    receiving instruction from the mobile device.

7. The method of claim 1, further comprising:
    connecting to a remote controller center through a cellular network; and
    receiving instruction from the remote controller.

8. The method of claim 1, further comprising receiving instruction from the user interface.

9. A battery solar power charging system for charging a battery pack comprising:
    At least one solar panel for generating electricity;
    a controller connected to the solar panel;
    at least one temperature sensor connected to the controller and sensing temperature of the battery;
    a battery charger connected to the battery for charging the battery; and
    a heater connected to the battery for heating up the battery,
    wherein
    the controller is also connected to a battery charging circuit and the heater,
    if the temperature of the battery is within a range for charging the battery and the at least one battery needs to be charged, the battery charger charges the battery using electricity generated by the solar panel; and if the temperature is below the range for charging the battery and the at least one battery needs to be charged, turning off the battery charger and the heater is turned on to heat up the battery.

10. The battery solar power charging system of claim 9, further comprising:

an over voltage protection circuit connected to the battery and sensing voltage of the battery; and an over current protection circuit connected to the controller and sensing the current of the battery, wherein if the voltage indicates the battery is not fully charged and the temperature is outside an acceptable range for charging, the heater is turned on; and if the voltage indicates the battery is not fully charged and the temperature is within the acceptable range for charging, the heater is turned off.

11. The battery solar power charging system of claim 9, further comprising a user interface for receiving instructions from a user and sending a status to the user.

12. The battery solar power charging system of claim 9, further comprising a communication unit for receiving instructions from a remote control center and for sending status to the remote control center.

13. The battery solar power charging system of claim 12, wherein the communication unit communicates with a cellular network.

14. The battery solar power charging system of claim 9, wherein the battery pack has a plurality of battery cells, during charging, for each battery cell, if its voltage exceeds the average voltage of all the battery cells by a predefined amount, turning on a switch to activate a bypass circuit for that battery cell.

* * * * *